United States Patent
Grubbs et al.

(10) Patent No.: US 7,346,620 B2
(45) Date of Patent: Mar. 18, 2008

(54) ADJUSTING LOG SIZE IN A STATIC LOGICAL VOLUME

(75) Inventors: Mark Allen Grubbs, Round Rock, TX (US); Gerald Francis McBrearty, Austin, TX (US); Duyen M. Tong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/777,722

(22) Filed: Feb. 12, 2004

(65) Prior Publication Data

US 2005/0182771 A1 Aug. 18, 2005

(51) Int. Cl.
*G06F 7/00* (2006.01)

(52) U.S. Cl. .................... 707/100; 707/104.1

(58) Field of Classification Search .......... 707/1–104.1
See application file for complete search history.

(56) References Cited

U.S. PATENT DOCUMENTS

| | | | | |
|---|---|---|---|---|
| 4,879,659 A * | 11/1989 | Bowlin et al. | ............... | 700/167 |
| 5,893,128 A * | 4/1999 | Nauckhoff | ................... | 715/511 |
| 5,897,661 A | 4/1999 | Baranovsky et al. | ........ | 711/170 |
| 6,014,674 A * | 1/2000 | McCargar | .................... | 707/202 |
| 6,163,856 A * | 12/2000 | Dion et al. | ..................... | 714/4 |
| 6,249,792 B1 | 6/2001 | Zwilling et al. | ............. | 707/205 |
| 6,353,902 B1 * | 3/2002 | Kulatunge et al. | .......... | 714/712 |
| 6,377,958 B1 * | 4/2002 | Orcutt | ......................... | 707/200 |
| 6,389,427 B1 | 5/2002 | Faulkner | .................. | 707/104.1 |
| 6,389,433 B1 | 5/2002 | Bolosky et al. | ............. | 707/205 |
| 6,466,935 B1 * | 10/2002 | Stuart | .......................... | 707/10 |
| 6,553,387 B1 | 4/2003 | Cabrera et al. | ............. | 707/200 |
| 6,604,183 B2 | 8/2003 | Beaven et al. | .............. | 711/170 |
| 6,856,993 B1 * | 2/2005 | Verma et al. | ............... | 707/101 |
| 7,085,999 B2 * | 8/2006 | Maeda et al. | ............... | 715/513 |
| 2001/0054049 A1 * | 12/2001 | Maeda et al. | ............... | 707/517 |
| 2002/0032835 A1 * | 3/2002 | Li et al. | ..................... | 711/114 |
| 2002/0053009 A1 * | 5/2002 | Selkirk et al. | .............. | 711/162 |
| 2002/0095495 A1 | 7/2002 | Otsuka et al. | .............. | 709/224 |
| 2002/0147733 A1 | 10/2002 | Gold et al. | .................. | 707/200 |
| 2003/0018619 A1 | 1/2003 | Abe et al. | ...................... | 707/3 |
| 2003/0028515 A1 | 2/2003 | Nishikado et al. | ............. | 707/1 |
| 2003/0101183 A1 | 5/2003 | Kabra et al. | .................. | 707/8 |
| 2003/0167409 A1 | 9/2003 | Sussman | ..................... | 713/201 |
| 2005/0108292 A1 * | 5/2005 | Burton et al. | ............... | 707/200 |

* cited by examiner

*Primary Examiner*—Don Wong
*Assistant Examiner*—Linh Black
(74) *Attorney, Agent, or Firm*—Matthew W. Baca; Amy J. Pattillo

(57) ABSTRACT

A method, system, and program for adjusting the size of a file system and an inline file system log housed in a static logical volume. A computer system includes a logical volume allocated between an file system and its inline file system log. A request is received to adjust the inline log from a current size to a new size while maintaining the size of the logical volume. Storage space is then allocated from within the logical volume to the inline log according to the storage requirement for the new size. Allocating storage space may require decreasing or increasing the amount of storage formerly allocated to the inline log. Then, the inline log is reformatted to the allocated storage space, such that the storage allocated to the inline log for a file system is adjusted while the size of the logical volume housing the inline log and file system remains static.

15 Claims, 3 Drawing Sheets

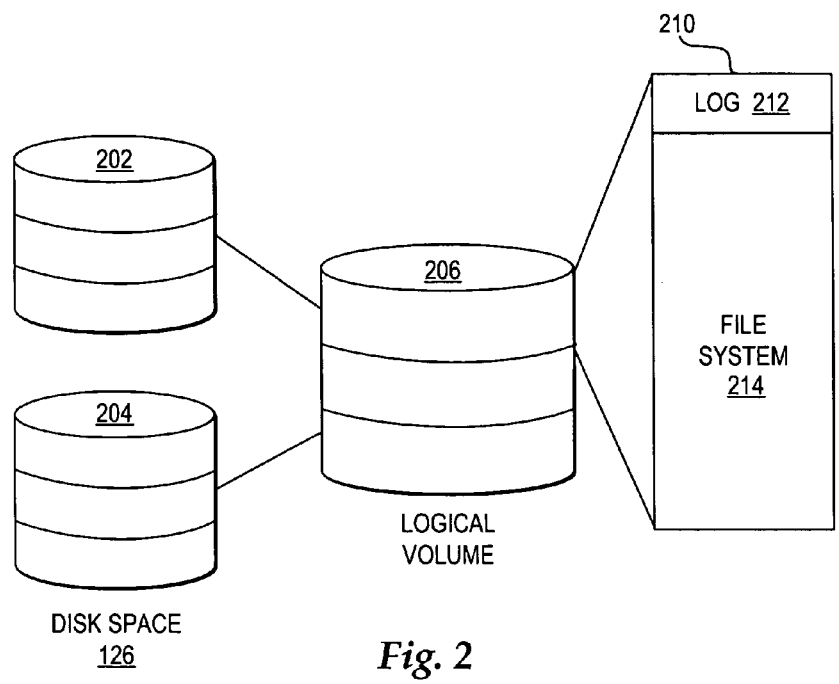
*Fig. 2*
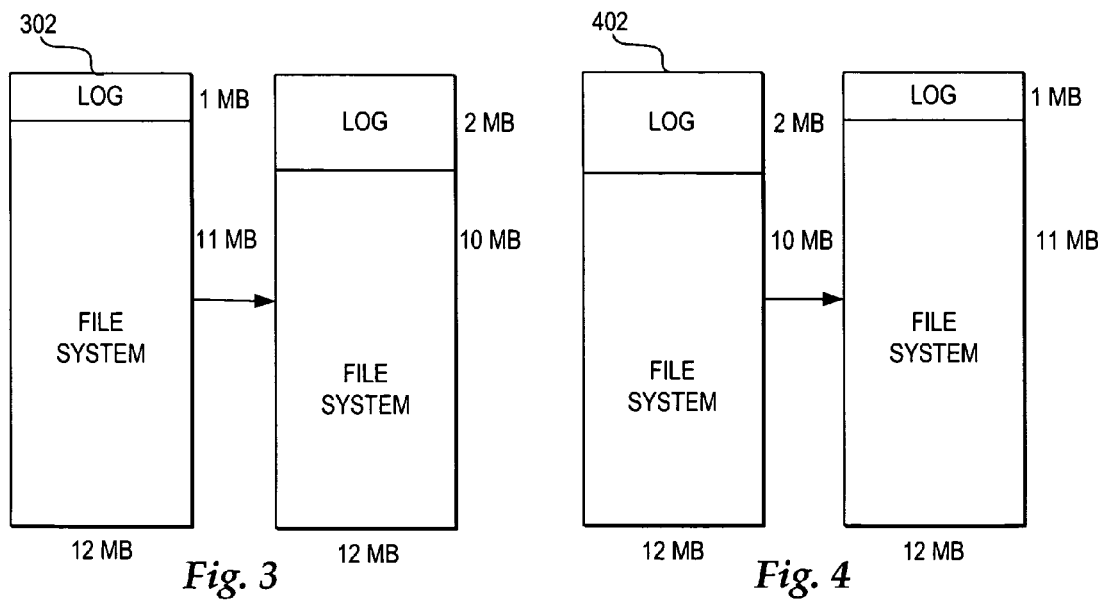
*Fig. 3*     *Fig. 4*

ADJUSTING LOG SIZE IN A STATIC LOGICAL VOLUME

BACKGROUND OF THE INVENTION

1. Technical Field

The present invention relates in general to improved logical volume management and in particular to improved adjustment of storage allocation within a logical volume. Still more particularly, the present invention relates to adjusting the storage space allocated between a file system and its file system log housed in a static logical volume.

2. Description of the Related Art

Most data processing systems include a data management system for managing the storage of files within the physical storage media available to the data processing system. In particular, data management systems may manage the storage of data files in file systems organized within logical volumes. Logical volumes include pages of physical storage media organized to appear as a contiguous data storage device, even though in reality the physical pages are not contiguous. In a file system, a file is traditionally logically subdivided into pages within the logical volume.

In addition, a data management system may implement a file system log that may be stored in the same logical volume as the file system. The log may be used to track changes to file system control data, also called metadata, such as blocks allocated, mapping of file allocation to logical blocks, directory contents, and other file system related data. The log can be used to help maintain consistency when the metadata is changed.

When initializing a logical volume, it is typical to assign a minimum number of physical pages to the logical volume for file system purposes. Then, if the log for the logical volume is stored in the logical volume, the pages assigned to the logical volume are further allocated among the log and file system.

While a file system and log may each be allocated a particular portion of the logical volume, the file system and log may each grow to need storage space larger than the allocated portion. Currently, when the log needs additional storage space, additional physical pages are added to the logical volume for the log. In addition, currently, when the file system size is insufficient, additional physical pages are added to the logical volume for the file system.

While adding physical pages to a logical volume is one way of compensating for underestimated file system and log needs, addition of physical pages is not always available. For example, as is typical, all of the physical pages of the physical storage media may already be allocated among the available logical volumes. Further, it is also typical that either the file system or log may have unused storage capacity, such that when the additional physical pages are added, other pages already allocated to the logical volume remain unused.

SUMMARY OF THE INVENTION

Therefore, in view of the foregoing, there is a need for a method, system, and program for adjusting the storage space allocated to a file system and its log housed within a logical volume without adjusting the size of the logical volume. In particular, it is advantageous to reallocate storage pages from within a static logical volume to meet the storage needs of the file system or inline log, rather than allocating additional physical pages to the logical volume, particularly where additional physical pages are not available or unused storage space is available in the logical volume.

According to one embodiment of the present invention, a request is received to adjust an inline log for a file system from a current size to a new size while maintaining a predetermined size of a logical volume housing the file system and its log. Pages of storage space are allocated from within the logical volume to the inline log according to the storage space required for said new size. The inline log is then reformatted to the allocated storage space within the logical volume, such that the storage space allocated to an inline log for a file system is adjusted while the total storage space allocated to the logical volume remains constant.

The request to adjust an inline log from a current size to a new size may be received from a system administrator or received from a file system controller. Further, the request to adjust the inline log from a current size to a new size may be a result of a request to adjust the size of the file system within the logical volume.

When storage space is allocated from the logical volume to the inline log, the new size of the log may be larger or smaller than the current size. Thus, to reallocate storage space from the logical volume to the inline log, the storage allocated to the file system in the logical volume may be increased or decreased from the current size of the file system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a block diagram depicting a logical volume housing a file system and its log in accordance with the method, system, and program of the present invention;

FIG. 3 is an illustrative representation of the static logical volume housing an expanded log in accordance with the method, system, and program of the present invention;

FIG. 4 is an illustrative representation of the static logical volume housing a reduced log in accordance with the method, system, and program of the present invention

DETAILED DESCRIPTION OF THE PREFERRED EMBODIMENT

Figure 1:
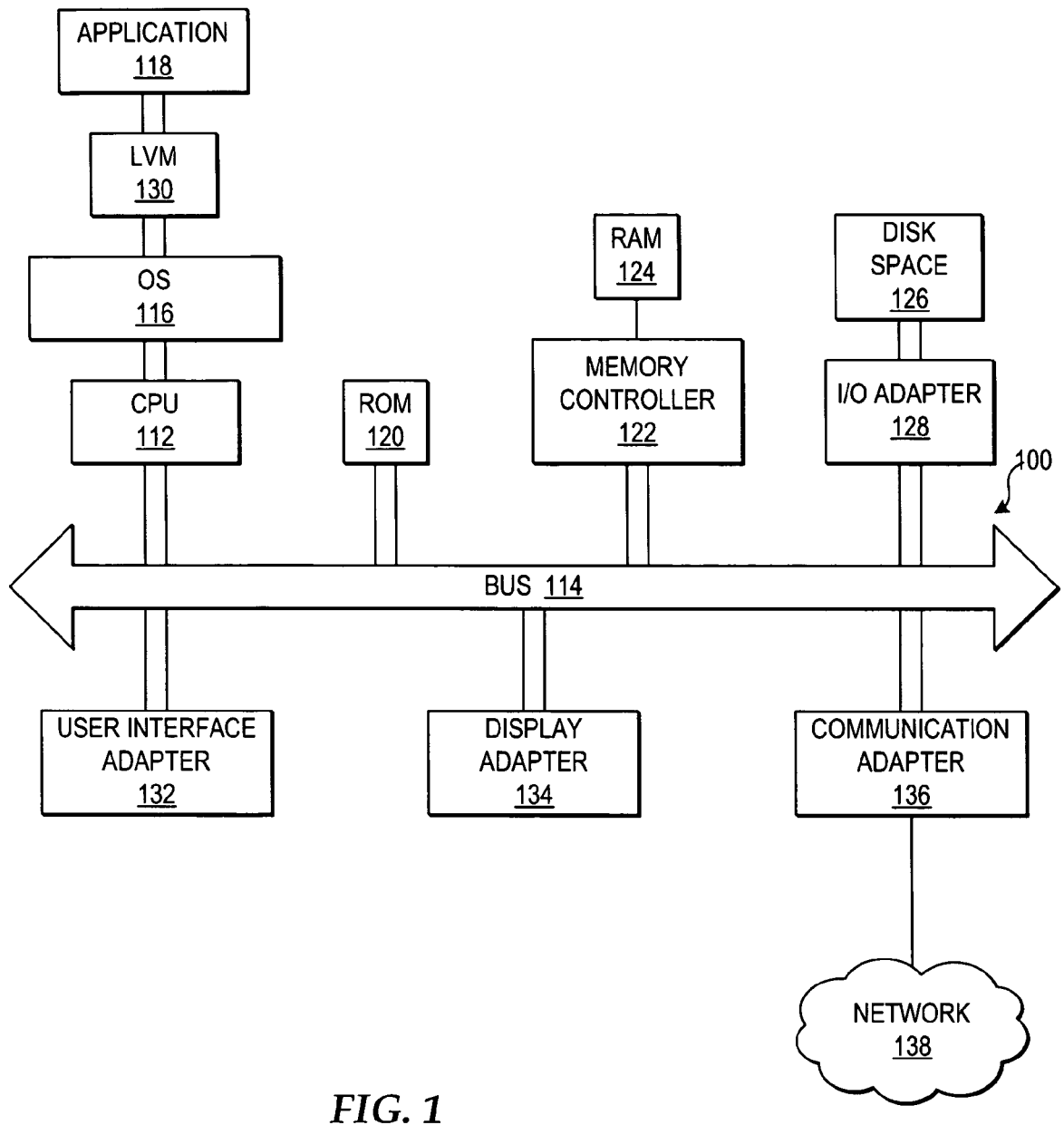
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system.

Computer system 100 includes a bus 114 or other communication device for communicating information within computer system 10, and at least one processing device such as central processing unit (CPU) 112, coupled to bus 114 for processing information. Bus 114 preferably includes low-latency and higher latency paths that are connected by bridges and adapters and controlled within computer system 100 by multiple bus controllers. When implemented as a server system, computer system 100 typically includes multiple processors designed to improve network servicing power.

CPU 112 may be a general-purpose processor such as IBM's PowerPC™ processor that, during normal operation, processes data under the control of an operating system (OS) 116 and application software 118 accessible from a dynamic storage device such as random access memory (RAM) 124 and a static storage device such as Read Only Memory (ROM) 120. OS 116 preferably controls the allocation and deallocation of memory within computer system 100. In a preferred embodiment, OS 116 contains machine executable instructions that when executed on processor 112 carry out the operations depicted in the flowcharts of FIG. 5, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to CPU 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is disk space 126 which as depicted is an internal component of computer system 100, but will be understood to also be provided by an external device. Volatile media include dynamic memory such as RAM 124. Transmission media include coaxial cables, copper wire or fiber optics, including the wires that comprise bus 114. Transmission media can also take the form of acoustic or light waves, such as those generated during radio frequency or infrared data communications.

Moreover, the present invention may be downloaded as a computer program product, wherein the program instructions may be transferred from a remote computer such as a server to requesting computer system 100 by way of data signals embodied in a carrier wave or other propagation medium via a network link (e.g., a modem or network connection) to a communications adapter 136 coupled to bus 114. Communications adapter 136 provides a two-way data communications coupling to a network link that may be connected, for example, to a local area network (LAN), wide area network (WAN), or directly to an Internet Service Provider (ISP). In particular, the network link may provide wired and/or wireless network communications to one or more networks, such as network 138. Network 138 may refer to the worldwide collection of networks and gateways that use a particular protocol, such as Transmission Control Protocol (TCP) and Internet Protocol (IP), to communicate with one another. Network 138 uses electrical, electromagnetic, or optical signals that carry digital data streams. The signals through the various networks and the signals through communication adapter 136, which carry the digital data to and from computer system 100, are exemplary forms of carrier waves transporting the information.

A memory controller 122 interfaces with bus 114 to control the memory within computer system 100. OS 116 preferably determines which portions of memory to allocate and deallocate and sends commands that are then implemented within the memory by memory controller 122. In particular, where OS 116 supports a virtual memory system, the memory system includes both RAM 124 and disk space 126. RAM 124 preferably includes multiple memory blocks and for purposes of the present invention preferably includes multiple logical memory blocks, such as 256 mega-byte (MB) dynamic RAMs (DRAM).

An I/O adapter 128 interfaces with bus 114 to control disk space 126. Disk space 126 may include multiple types of non-volatile storage space accessible from multiple types of I/O devices including, but not limited to, direct access storage devices (DASD). Disk space 126 is partitioned into multiple logical volumes by a logical volume manager (LVM) 30. LVM 130 may be regarded as being made up of a set of operating system commands, library subroutines, or other tools that allow a user to establish and control logical volume storage. A logical partition maintained by LVM 130 may include several direct access storage devices, but to the applications the logical partition appears as a single storage device. Each logical volume is further divided into multiple pages. Each page represents a block of storage of fixed or variable size. LVM 130 controls the physical storage system resources by mapping data between a simple and flexible logical view of storage space and the actual physical storage system. LVM 130 does this by using a layer of device driver code that runs above traditional device drivers. As depicted, LVM 130 is located between OS 116 and application 118, however in alternate embodiments, LVM 130 may be incorporated within OS 116 or another component of computer system 100.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Further, multiple peripheral components may be added to computer system 100, connected to multiple controllers, adapters, and expansion slots coupled to one of the multiple levels of bus 114. For example, a user interface adapter 132 connectively enabled on bus 114 provides an interface for a keyboard and cursor control device, such as a mouse, trackball, or cursor direction keys. In addition, a display adapter 134 is connectively enabled on bus 114 for provide an interface for connecting a monitor or other display for providing visual, tactile, or other graphical representation formats. In alternate embodiments of the present invention, additional input and output peripheral adapters and components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

With reference now to FIG. 2, there is depicted a block diagram of logical volume housing a file system and its file system log in accordance with the method, system, and program of the present invention. As illustrated, disk space 126 includes multiple disks 202 and 204. The pages of disks 202 and 204 are organized into logical units or pages of multiple bytes of storage in a logical volume 206. In the example, logical volume 206 is organized in multiple partitions, however it will be understood that logical volume 206 may be organized in a single partition.

In particular, LVM 130 arranges the physical storage systems of disk space 126 into volume groups in order to give the impression that logical volume 206 is a single voluminous disk space. Each logical volume in a logical volume group is divided into logical partitions. Likewise, each physical volume in a volume group is divided into physical partitions. Each logical partition corresponds to at least one physical partition of disk space 126. But, although the logical partitions in a logical volume are numbered consecutively or appear to be contiguous to each other, the physical partitions to which they each correspond, need not be contiguous to each other. And indeed, most often, the physical partitions are not contiguous to each other.

One partition of logical volume 206 is illustrated at reference numeral 210. The partition includes an inline log 212 and a file system 214. Log 212 preferably tracks the directory for file system 214. In addition, log 212 contains other file system control data such as the blocks allocated within the logical volume, the mapping of file allocation to logical blocks, and other related information. Thus, one of the many tasks of LVM 130 is updating log 212 with the mapping and other information for file system 214.

Referring now to FIG. 3, there is depicted an illustrative representation of the static logical volume housing an expanded log in accordance with the method, system, and program of the present invention. As illustrated, a logical volume 302 houses a file system and its log. In the example, logical volume 302 is initially allocated with 12 MB of disk space. It will be understood that in alternate embodiments, logical volume 302 may be a logical volume of an alternate size.

In the example, 1 MB of disk space is originally allocated to the log. After a request to adjust the log to 2 MB, but maintain the size of the logical volume, the size of the file system is shrunk to 10 MB and the log size readjusted to 2 MB. Advantageously, multiple types of methods may be used to shrink the size of the file system without deleting the data stored in the file system.

It is important to note that the size of the logical volume may be adjusted, however, as an advantage of the present invention, the size of the logical volume remains static while the allocation of storage space to the log and to the file system is adjusted within the logical volume.

With reference now to FIG. 4, there is depicted an illustrative representation of the static logical volume with housing a reduced log in accordance with the method, system, and program of the present invention. As illustrated a logical volume 402 houses a file system and its log. In the example, logical volume 402 is 12 MB. In the example, the log is originally set to 2 MB. After a request to adjust the log to 1 MB, but maintain the size of the logical volume, the size of the log is reduced to 1 MB and the remaining storage space is added to the file system.

Figure 5:
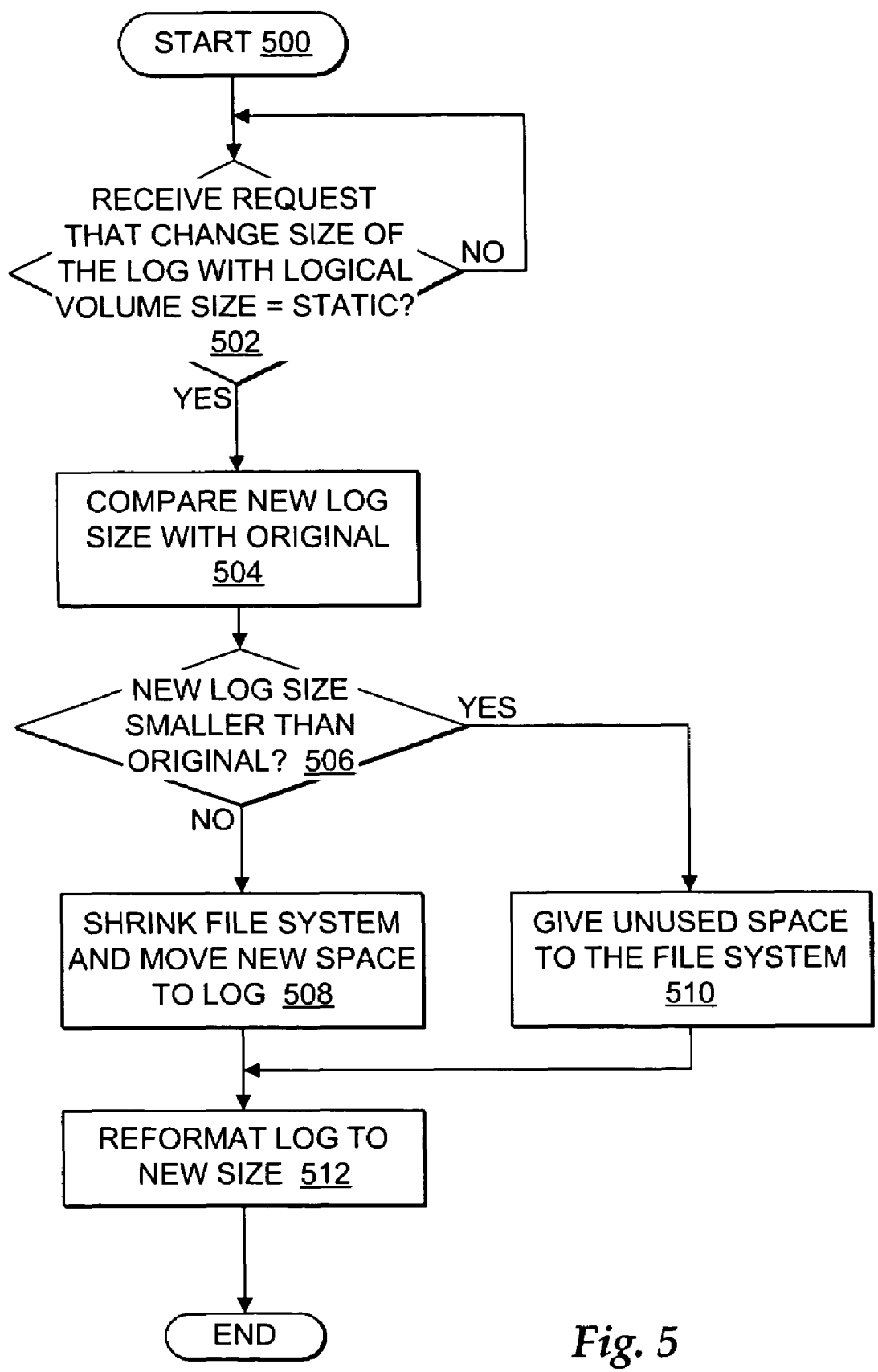
FIG. 5 depicts a high level logic flowchart of a process and program for adjusting a size of a log housed within a static logical volume in accordance with the method, system, and program of the present invention

Referring now to FIG. 5, there is depicted a high level logic flowchart of a process and program for adjusting a size of a log housed within a static logical volume in accordance with the method, system, and program of the present invention. As illustrated, the process started at block 500 and thereafter proceeds to block 502. Block 502 depicts a determination whether a request to change the size of the log, but keep the logical volume size static is received. If a request is not received, then the process iterates at block 502. If a request is received, then the process passes to block 504. Block 504 illustrates comparing the new log size requested with the original log size, and the process passes to block 506.

Block 506 depicts a determination whether the new log size requested is smaller than the original log size. If the new log size is smaller than the original log size, then the process passes to block 510. Block 510 depicts giving the unused space to the file system. Next, block 512 illustrates reformatting the log to the new size, and the process ends. Alternatively, at block 506, if the new log size is not smaller than the original, then the process passes to block 508. Block 508 depicts shrinking the file system and moving the new space to the log, and the process passes to block 512.

While the invention has been particularly shown and described with reference to a preferred embodiment, it will be understood by those skilled in the art that various changes in form and detail may be made therein without departing from the spirit and scope of the invention.

What is claimed is:

1. A method for adjusting the size of an inline log for a file system, comprising:

receiving a request to adjust an allocated size for an inline log for a file system from a current size allocation to a new size allocation while maintaining a size allocation of a logical volume, wherein said inline log and said file system are stored in said logical volume;

responsive to said request to adjust said allocated size for said inline log for said file system from said current size allocation to said new size allocation while maintaining said size allocation of said logical volume, shrinking a portion of a total storage space allocated to said file system within said logical volume and allocating additional storage space available from shrinking said portion of said total storage space allocated to said file system within said logical volume to said inline log according to a storage requirement for said new size allocation; an reformatting said inline log to said additional allocated storage space, such that said storage space allocated to said inline log for said file system is adjusted while said size allocation of said logical volume housing said inline log and said file system remains static.

2. The method according to claim 1 for adjusting the size of an inline log, wherein receiving a request to adjust an inline log further comprises:

receiving said request from a system administrator.

3. The method according to claim 1 for adjusting the size of an inline log, wherein receiving a request to adjust an allocated size for an inline log further comprises:

receiving a first request to adjust said allocated size for said inline log for said file system from said current size allocation to said new size allocation;

detecting that additional storage space is not available for allocation to said logical volume for said first request; and triggering said request to adjust said allocated size for said inline log for said file system from said current size allocation to said new size allocation while maintaining said allocated size of said logical volume.

4. The method according to claim 1 for adjusting the size of an inline log, wherein receiving a request to adjust an allocated size for an inline log further comprises:

receiving a first request to adjust an allocated size for said file system from a current file system size allocation to a new file system size allocation; and triggering said request to adjust said allocated size for said inline log from said current size allocation to said new size allocation to compensate for said first request to adjust said allocated size for said file system from said current file system size allocation to a new file system size allocation.

5. The method according to claim 1 for adjusting the size of an inline log, wherein allocating storage space from said logical volume to said inline log further comprises:

increasing the total storage space allocated to said file system in said logical volume.

6. A system for adjusting the size of an inline log for a file system without adjusting a size of a logical volume storing said inline log and said file system, comprising:

means for receiving a request to adjust an allocated size for an inline log for a file system from a current size allocation to a new size allocation while maintaining a size allocation of a logical volume;

means, responsive to said request to adjust said allocated size for said inline log for said file system from said current size allocation to said new size allocation while maintaining said size allocation of said logical volume, for shrinking a portion of a total storage space allocated to said file system within said logical volume and allocating additional storage space available from shrinking said portion of said total storage space allocated to said file system from within said logical volume to said inline log according to a storage space requirement for said new size allocation; and means for reformatting said inline log to said additional allocated storage space.

7. The system according to claim 6 for adjusting the size of an inline log, wherein said means for receiving a request to adjust an inline log further comprises:

means for receiving said request from a system administrator.

8. The system according to claim 6 for adjusting the size of an inline log, wherein said means for receiving a request to adjust an allocated size for an inline log further comprises:

means for receiving a first request to adjust said allocated size for said inline log for said file system from said current size allocation to said new size allocation;

means for detecting that additional storage space is not available for allocation to said logical volume for said first request; and means for triggering said request to adjust said allocated size for said inline log for said file system from said current size allocation to said new size allocation while maintaining said allocated size of said logical volume.

9. The system according to claim 6 for adjusting the size of an inline log, wherein said means for receiving a request to adjust an allocated size for an inline log further comprises:

means for receiving a first request to adjust an allocated size for said file system from a current file system size allocation to a new file system size allocation; and means for triggering said request to adjust said allocated size for said inline log from said current size allocation to said new size allocation to compensate for said first request to adjust said allocated size for said file system from said current file system size allocation to a new file system size allocation.

10. The system according to claim 6 for adjusting the size of an inline log, wherein said means for allocating storage space from within said logical volume to said inline log further comprises:

means for increasing the total storage space allocated to said file system within said logical volume.

11. A computer program product, residing in a computer readable medium, for adjusting the size of an inline log for a file system within a static logical volume, comprising:

means for receiving a request to adjust an allocated size for an inline log for a file system from a current size allocation to a new size allocation while maintaining a size allocation of a logical volume;

means, responsive to said request to adjust said allocated size for said inline log for said file system from said current size allocation to said new size allocation while maintaining said size allocation of said logical volume, for shrinking a portion of a total storage space allocated to said file system within said logical volume and allocating additional storage space available from shrinking said portion of said total storage space allocated to said file system from within said logical volume to said inline log according to a storage space requirement for said new size allocation; and means for reformatting said inline log to said additional allocated storage space.

12. The computer program product according to claim 11 for adjusting the size of an inline log, wherein said means for receiving a request to adjust an inline log further comprises:

means for receiving said request from a system administrator.

13. The computer program product according to claim 11 for adjusting the size of an inline log, wherein said means for receiving a request to adjust an allocated size for an inline log further comprises:

means for receiving a first request to adjust said allocated size for said inline log for said file system from said current size allocation to said new size allocation;

means for detecting that additional storage space is not available for allocation to said logical volume for said first request; and means for triggering said request to adjust said allocated size for said inline log for said file system from said current size allocation to said new size allocation while maintaining said allocated size of said logical volume.

14. The computer program product according to claim 11 for adjusting the size of an inline log, wherein said means for receiving a request to adjust an allocated size for an inline log further comprises:

means for receiving a first request to adjust an allocated size for said file system from a current file system size allocation to a new file system size allocation; and means for triggering said request to adjust said allocated size for said inline log from said current size allocation to said new size allocation to compensate for said first request to adjust said allocated size for said file system from said current file system size allocation to a new file system size allocation.

15. The computer program product according to claim 11 for adjusting the size of an inline log, wherein said means for allocating storage space from within said logical volume to said inline log further comprises:

means for increasing the total storage space allocated to said file system in said logical volume.

* * * * *